US009313290B2

(12) United States Patent
Joy

(10) Patent No.: US 9,313,290 B2
(45) Date of Patent: Apr. 12, 2016

(54) DATA TRANSFER BETWEEN DEVICES

(75) Inventor: Ian M. Joy, Fife (GB)

(73) Assignee: NCR Corporation, Duluth, GA (US)

( * ) Notice: Subject to any disclaimer, the term of this patent is extended or adjusted under 35 U.S.C. 154(b) by 76 days.

(21) Appl. No.: 13/474,292

(22) Filed: May 17, 2012

(65) Prior Publication Data

US 2013/0310063 A1    Nov. 21, 2013

(51) Int. Cl.
*H04W 24/00* (2009.01)
*H04L 29/08* (2006.01)
*H04W 4/02* (2009.01)
*H04W 4/20* (2009.01)
*G06F 3/01* (2006.01)

(52) U.S. Cl.
CPC ............ *H04L 67/2814* (2013.01); *G06F 3/017* (2013.01); *H04W 4/021* (2013.01); *H04W 4/023* (2013.01); *H04W 4/026* (2013.01); *H04W 4/027* (2013.01); *H04W 4/206* (2013.01); *H04L 67/06* (2013.01)

(58) Field of Classification Search
CPC ....... G06K 84/18; H04W 64/00; H04W 4/02; H04W 4/14; H04W 28/04; G06F 3/1423; G06F 30/486; G06F 3/048883; G06F 3/016; G06Q 10/107; H04L 29/06
USPC .................... 455/41.2, 41.3, 456.1–457, 466; 370/329, 338; 715/761, 769, 863; 709/206, 228; 345/156
See application file for complete search history.

(56) References Cited

U.S. PATENT DOCUMENTS

| | | | | |
|---|---|---|---|---|
| 4,563,758 A | * | 1/1986 | Paternostro | 367/132 |
| 5,745,116 A | * | 4/1998 | Pisutha-Arnond | 715/863 |
| 6,799,035 B1 | * | 9/2004 | Cousins | 455/418 |
| 7,024,207 B2 | * | 4/2006 | Gorday et al. | 455/456.1 |
| 7,065,373 B2 | * | 6/2006 | Rodgers et al. | 455/502 |
| 7,366,516 B1 | * | 4/2008 | Oh et al. | 455/445 |
| 7,460,011 B1 | * | 12/2008 | Liau et al. | 340/539.1 |
| 7,778,219 B2 | * | 8/2010 | Zhang | 370/329 |
| 8,046,701 B2 | * | 10/2011 | Chiu et al. | 715/761 |
| 8,380,225 B2 | | 2/2013 | Cheng et al. | |
| 8,386,620 B2 | * | 2/2013 | Chatterjee | 709/228 |
| 2006/0256074 A1 | * | 11/2006 | Krum et al. | 345/156 |
| 2010/0017489 A1 | * | 1/2010 | Birnbaum et al. | 709/206 |
| 2011/0202859 A1 | * | 8/2011 | Fong | 715/769 |
| 2012/0102437 A1 | * | 4/2012 | Worley et al. | 715/863 |

FOREIGN PATENT DOCUMENTS

WO     WO2011063847 A1    6/2011

* cited by examiner

*Primary Examiner* — Steve D Agosta
(74) *Attorney, Agent, or Firm* — Schwegman, Lundberg & Woessner

(57) ABSTRACT

A method of implementing data transfer from a mobile device is described. The method comprises: (i) receiving positional information from the mobile device; (ii) receiving directional information from the mobile device; and (iii) receiving data from the mobile device. The method further comprises: (iv) ascertaining a receiving device based on the received directional information; and (v) providing the data received from the mobile device to the ascertained receiving device.

5 Claims, 5 Drawing Sheets

DATA TRANSFER BETWEEN DEVICES

FIELD OF INVENTION

The present invention relates to data transfer between devices.

BACKGROUND OF INVENTION

In many environments, such as in business meetings, social meetings, gaming establishments (such as casinos), multi-player games (either physical or virtual), and the like, it is desirable to be able to share information with other people quickly and dynamically.

Although rapid communications between individuals has been improved by social media and communications facilities (for example, instant messaging, status updating and tracking, sharepoints, and the like), it is still difficult to transfer data between individuals in a group in a rapid manner, particularly if the group is changing dynamically or if the participants do not know each other.

SUMMARY OF INVENTION

Accordingly, the invention generally provides methods, systems, apparatus, and software for facilitating data transfer from a first person's mobile device to another device using positional and/or direction information provided by the first person's device.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of implementing data transfer from a mobile device, the method comprising:

(i) receiving positional information from the mobile device;

(ii) receiving directional information from the mobile device;

(iii) receiving data from the mobile device;

(iv) ascertaining a receiving device based on the received directional information; and (v) providing the data received from the mobile device to the ascertained receiving device.

Steps (i) to (iii) may be implemented concurrently (for example, in the same transmission) or in any desired order (for example, step (ii) first, then step (iii) then step (i)).

The positional information may be provided via a cellular system based on the location of the mobile device as detected by the cellular transmission system. Alternatively, the mobile device may provide the positional information from an integrated global positioning system within the mobile device.

The directional information may be ascertained by the mobile device. This may be implemented using an internal accelerometer, thereby detecting how a user of the mobile device is moving the mobile device. Alternatively, this may be implemented by the mobile device sensing points touched by the user of the mobile device on a touchscreen of the mobile device, for example, by sensing the user swiftly flicking his/her finger over the touchscreen surface.

The data received from the mobile device may relate to an image (such as a photograph or artwork), a document (such as a letter, email, spreadsheet, or presentation), a game (such as an activity performed by the user of the mobile device), or any other information in electronic form.

Ascertaining a receiving device based on the received directional information may include ascertaining a device located in the direction of motion provided by the user of the mobile device (for example, the user may swiftly move the mobile device towards the receiving device, or may apply a flicking motion of his/her finger to the touchscreen in the direction of the receiving device). Alternatively, ascertaining a receiving device based on the received directional information may include ascertaining a plurality of receiving devices selected by the user of the mobile device in addition to the received directional information from the mobile device.

Providing the data received from the mobile device to the ascertained receiving device may include providing the ascertained receiving device with an identification of the mobile device.

The method may include the step of registering the mobile device when the mobile device enters an interaction environment. The interaction environment may be relatively small, for example, within an office, an entertainment establishment, a stadium, or a home, where a local wireless network (such as one based on one of the 802.11 standards) is used. Alternatively, the interaction environment may be relatively large, for example, within a city, county, country, or globally, where a wide area wireless network (such as the Internet or a satellite or cellular communications system) is used.

The step of registering the mobile device when the mobile device enters an interaction environment may be implemented by the user of the mobile device providing an identification to a management application, where the management application implements the steps described above. The mobile device may register automatically when it enters the interaction environment. The identification may comprise a telephone number associated with the mobile device. Alternatively, the identification may comprise an email address, a username, a MAC address or other type of unique hardware identifier, or the like.

The mobile device may comprise a cellular telephone, such as a so-called "smartphone".

The method may further comprise the additional step of: receiving velocity and/or acceleration information from the mobile device; and the step of ascertaining a receiving device based on the received directional information may include ascertaining the receiving device based also on the received velocity and/or acceleration information.

The mobile device may provide the positional and/or directional information via a defined interface.

The mobile device may execute a data sharing application (downloadable from a relevant application store for that type of device) that includes the defined interface and that includes contact information for communicating with a management application appropriate for the mobile device's location and/or environment.

The data sharing application may provide a user of the mobile device with options for: sharing data (for example, opting in or opting out of sharing data), groups available that are open to new participants, creating a new group, defining properties of the new group (for example, sports, discussion group, privacy settings), and the like.

The receiving device may comprise a mobile device (such as another smartphone) or a static device (such as a printer or a file server).

According to a second aspect there is provided a management application operable to implement the steps of the first aspect.

The management application may be implemented as a cloud application.

According to a third aspect there is provided a method of implementing data transfer from a mobile device, the method comprising:

(i) providing positional information about the mobile device to a management application;

(ii) providing directional information from the mobile device to the management application; and (iii) providing data from the mobile device.

These steps may be implemented in any convenient order.

The information provided in steps (i) and (ii) may be provided via a defined interface using a downloaded application.

According to a fourth aspect there is provided a method of implementing data transfer from a mobile device to a receiving device, the method comprising:

registering the mobile device;
receiving positional information from the mobile device;
receiving directional information from the mobile device;
receiving data from the mobile device;
identifying spatial positions of other registered devices;
selecting a receiving device from one of the registered devices based on the received directional information and the spatial positions of the registered devices; and
transferring the data received from the mobile device to the selected receiving device.

The selected receiving device may be a static device (such as a desktop computer, a printer, a file server, or the like) or a mobile device (such as a cellular telephone, an automobile, or the like).

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
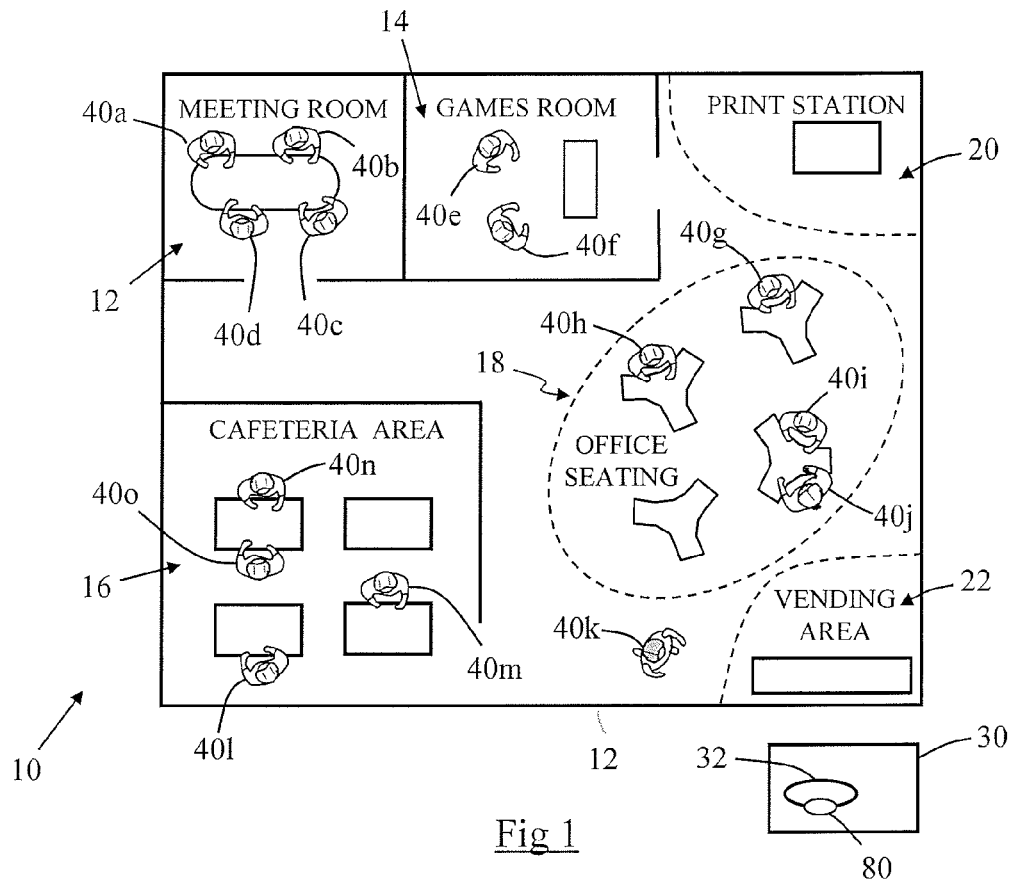
FIG. 1 is a schematic plan view of an office area in which data transfer occurs between mobile devices, according to one embodiment of the present invention.

Reference will now be made to FIG. 1, which is a schematic plan view of an office area 10 in which data transfer occurs between devices, according to one embodiment of the present invention.

In FIG. 1, the office area 10 comprises the following zones: a business meeting room 12, a games room 14, a cafeteria 16, an office seating area 18, a print station 20, and a vending area 22 (the first three zones are illustrated by solid lines, the last three zones are illustrated by broken lines).

A server 30 (referred to as a cloud server because the geographic location of the server 30 is not important) is provided that hosts a management application 32. The cloud server 30 may be inside or outside the office area 10.

Fifteen people 40a-o (also referred to as "users") are illustrated in different parts of the office area 10. Each of these persons 40a-o has a mobile device (not shown in FIG. 1 for clarity).

Figure 2:
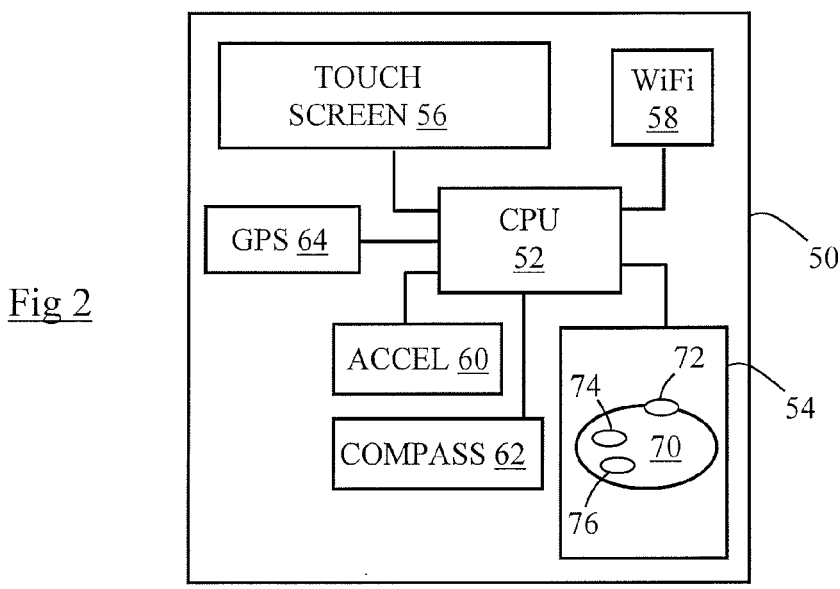
FIG. 2 is a simplified block diagram of a mobile device for use with the system of FIG. 1.

Reference will now also be made to FIG. 2, which is a simplified block diagram of a representative mobile device 50, similar to the mobile device carried by each person 40.

In this embodiment each mobile device 50 is a conventional cellular telephone (cell phone) having a touch-sensitive display (referred to as a touchscreen) and Internet access. Such cell phones 50 are typically referred to as smartphones.

In addition to specific components dedicated to telephony (microphone, loudspeaker, codec, cellular transceiver, and the like), which are not illustrated in FIG. 2, the smartphone 50 comprises a controller 52 and associated memory 54, a touchscreen 56, an 802.11 wireless transceiver 58, an accelerometer 60, a digital compass 62, and a GPS device 64. The smartphone 50 includes other components, but these are not essential to an understanding of this embodiment.

The smartphone 50 is a conventional smartphone (that includes the components listed above) of the type provided by any one of various vendors (such as Apple, Samsung, HTC, Nokia, Sony Ericsson (all trade marks of their respective owners)).

In addition to the conventional system software (not shown for clarity) provided with the smartphone 50 and resident in memory 54, the smartphone 50 also executes a data sharing application 70 (downloadable from a relevant application store for that type of smartphone). The data sharing application 70 provides a defined management interface (illustrated schematically in FIG. 2 by ellipse 72) that communicates with the management application 32 in the cloud server 30.

The data sharing application 70 also includes a communication object 74 that stores details of how to communicate with the management application 32 (such as an IP address and port number) and manages communications between the management application 32 and the data sharing application 70.

The data sharing application 70 also includes a configuration object 76 that stores data related to the user 40, allows the user 40 to request creation of sharing groups, stores information about the sharing groups the user 40 has joined, allows the user to set parameters for who can join a sharing group they have created, set privacy parameters, and the like.

Referring again to FIG. 1, the management application 32 provides a defined device interface (illustrated schematically in FIG. 1 by ellipse 80) that communicates with the data sharing application 70 executed by each smartphone 50 carried by the users 40.

Figure 3:
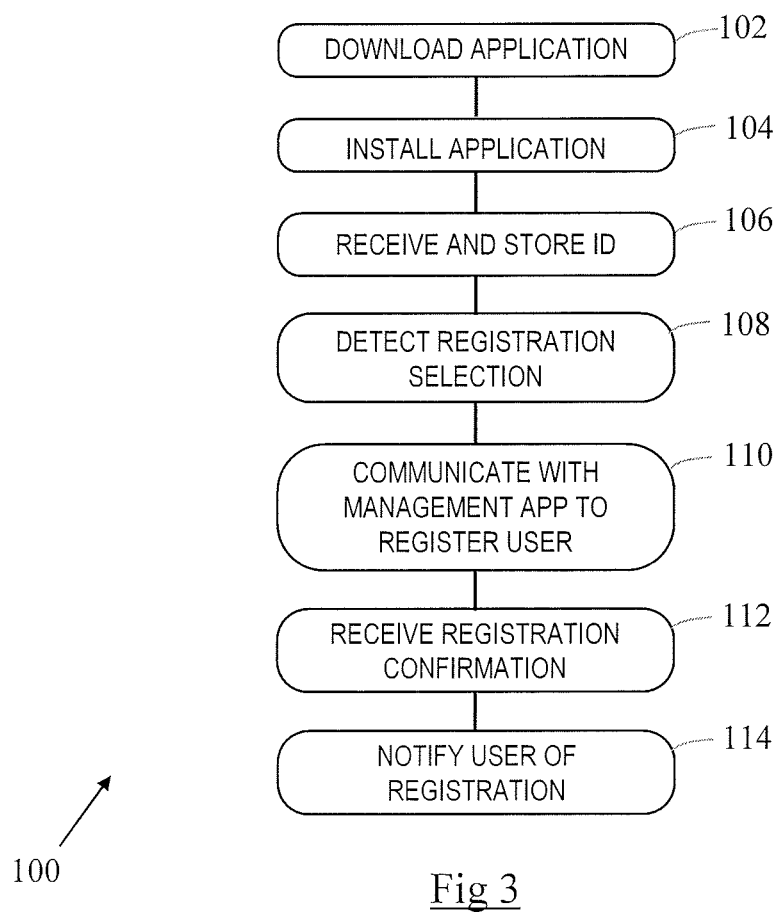
FIG. 3 is a flowchart illustrating steps implemented by the mobile device of FIG. 2 to register with a management application associated with the office area of FIG. 1.

Reference will now be made to FIG. 3, which is a flowchart 100 illustrating steps implemented by a smartphone 50 carried by a user 40 in registering with the management application 32.

Initially, the user 40 downloads the data sharing application 70 (referred to hereinafter as application 70) from an application store to the user's smartphone 50 (step 102). The application 70 may be free or there may be a charge for downloading and/or using the application 70.

The user 40 then installs the application 70 (step 104) after agreeing to whatever license terms are required to install and execute the application 70.

Once installed, the user 40 launches the application 70 and provides a unique identifier (for example, a username) to the application 70 (this may comprise an email address, a telephone number, an IP address, or any other unique identifier, such as a string of characters selected by the user 40). The application 70 receives and stores this unique identifier in the configuration object 76 (step 106) (after confirming that the username is indeed unique). In some embodiments the user 40 may have to provide a unique identifier prior to downloading the application 70 (that is, prior to step 102).

The user 40 then selects a register option presented by the application 70 on the touchscreen 56, which the smartphone detects (step 108). The communication object 74 then communicates with the management application 32 on the server 30, via the defined device interface 80, to register the user 40 with the management application 32 (step 110).

Part of the registration process of step 110 involves the management application 32 receiving registration information from the communication object 74 about (i) the location of the smartphone 50 (from the GPS device 64), (ii) share groups that the user 40 is a member of (from the configuration object 76), and (iii) any services that the user's smartphone 50 provides (from the configuration object 76). The user's smartphone 50 does not provide any services, but if the registered device was a printer (such as the printer at print station 20), then the services provided may include printing. The management application 32 stores this registration information.

Once the user 40 has been registered by the management application 32, the management application 32 provides the application 70 with confirmation of registration, which the application 70 receives (step 112). The application 70 then notifies the user 40 that registration has been successful (step 114).

The user 40 is now registered with the management application 32. The user 40 can now transfer data from his/her smartphone 50 to other devices registered with the management application 32, as will now be described in three different scenarios (all provided merely by way of illustration).

Scenario 1—Business Meeting

The first scenario involves the user 40 participating in a business meeting in the meeting room 12. As shown in FIG. 1, there are four people in the meeting room 12, namely users 40a to 40d.

In this scenario, user 40a desires to share a presentation with the other attendees (users 40b,c,d) so that all four participants can modify and update the presentation. Each of the users 40a,b,c,d has already registered with the management application 32.

Figure 4:
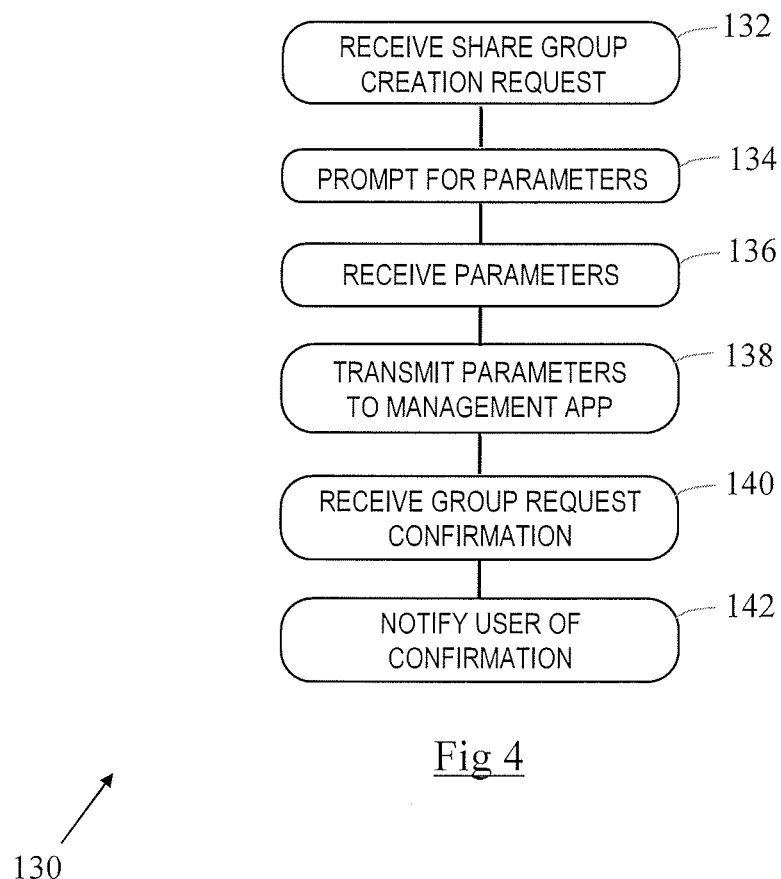
FIG. 4 is a flowchart illustrating steps implemented by an application executing on the mobile device of FIG. 2 to create a new share group with the management application associated with the office area of FIG. 1.

Reference will now be made to FIG. 4, which is a flowchart 130 illustrating the steps performed at the user's smartphone 50a (that is, the smartphone of user 40a) to create a new share group restricted to the participants in the meeting (namely, users 40a,b,c, and d).

Initially, the user 40a uses the application 70 on his/her smartphone 50a to create a new share group. This is achieved using a "create share group menu option" (not shown) provided by the application 70. The application 70 receives this share group creation request (step 132).

The application 70 then prompts the user 40a to enter parameters relating to the new share group (step 134). These parameters include: the group name (which is "business plan share group" in this example), the maximum size of the group (in this example it may be four people), and whether the group is public or private (it is private in this example).

The application 70 then receives these parameters (step 136), and then communicates this share group creation request (including the received parameters) to the management application 32 using the management interface 72 and the communication object 74 (step 138).

The management application 32 uses this received information to create a new share group with the requested name ("business plan share group") and other requested properties. By default, the user 40a is listed as the group owner because he/she transmitted the request to create a new share group.

The management application 32 then transmits a confirmation message to the application 70, which confirms to the user 40a that the share group has been created (step 140).

The application 70 then notifies the user 40a that the new share group has been created (step 142) by the management application 32.

Once the share group has been created, the user 40a can invite other attendees to join the group. This can be achieved by the user 40a sending an email, instant message, or other communication to the other three participants 40b,c,d with a link enabling them to join the group. Alternatively, the other three meeting participants can enter the share group name (which is not published by the management application 32 because it is a private meeting) and a meeting passcode (assigned by the management application 32 when the share group was created, or selected by the user 40a as part of the share group creation request).

Once all four participants have joined the meeting, they can freely share information between devices in the following way.

One user (for example, user 40b) desires to share a presentation with another participant (for example, user 40c). To do this, while the application 70 is executing, the user 40b selects the presentation to be shared, points his device at user 40c, and flicks the presentation towards user 40c by moving his finger over the touchscreen 56 in the direction of the user 40c.

Figure 5:
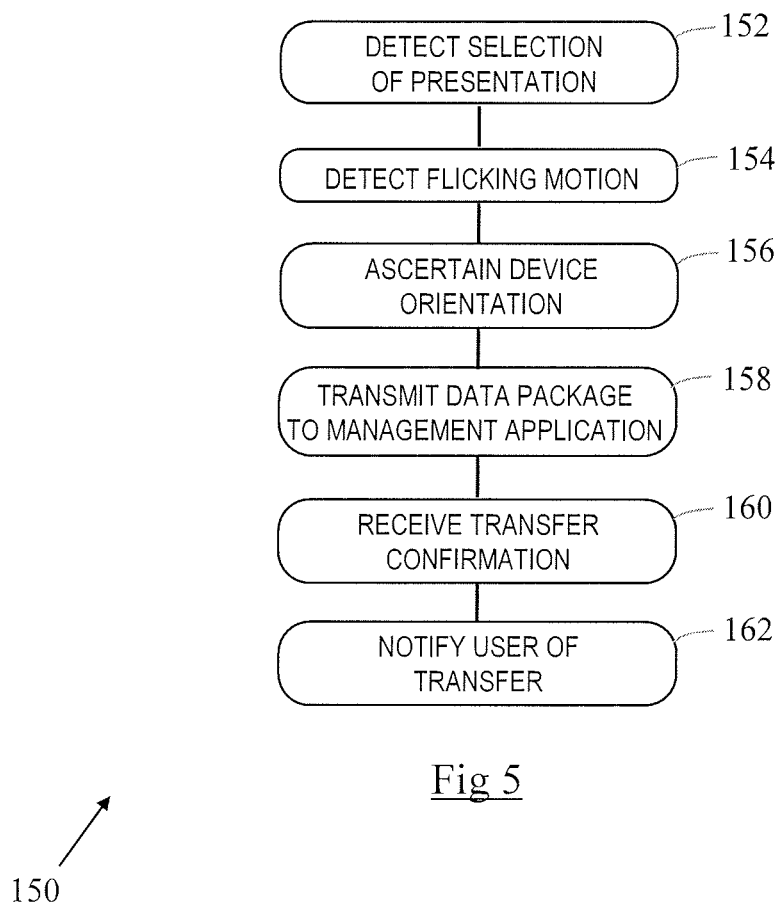
FIG. 5 is a flowchart illustrating the steps implemented by the application executing on the mobile device of FIG. 2 as part of a meeting involving document sharing between devices.

Reference will now be made to FIG. 5, which is a flowchart 150 illustrating the steps implemented by the application 70 in interpreting this action by user 40b.

Initially the application 70 detects that the presentation has been selected (step 152).

The application 70 then detects that the user has made a flicking motion with his finger across the touchscreen 56 (step 154). This is detected because a sequence of contact points on the touchscreen 56 are detected (by the controller 52) that all lie on a generally straight line. The application 70 interprets this action as meaning that the user 40b desires to transmit the selected presentation to the nearest device that is generally in line with (on the trajectory of) this motion.

The application 70 ascertains the orientation of the device 50b using the digital compass 62 (step 156).

The application 70 then transmits a data package to the management application 32 via the management interface 72 and the communication object 74 (step 158). The data package comprises: (i) a copy of the presentation, (ii) details of the orientation of the device 50b when the user action occurred, and (iii) details of the type and direction of the user action (in this example, a continuous line was delineated by user 40b from a lower part of the touchscreen 56 to an upper part of the touchscreen 56 (if the touchscreen 56 is considered as a clockface, the movement would correspond to movement from 6 o'clock to 12 o'clock).

The management application 32 receives this data package via defined interface 80 and uses the orientation of the device 50b and the direction of the user's action to ascertain which device should receive the presentation. In this example, the user 40b is part of a private share group, so the management application 32 identifies the participant device that is closest to the trajectory of the action performed by user 40b. In this example, it is user 40c, so the management application 32 transfers the copy of the presentation to device 50c. The management application 32 then notifies the application 70 that the presentation was transferred to device 50c. The application 70 receives this notification (step 160) and informs the user 40b accordingly (step 162).

The application 70 also has a menu option that allows a user 40 to send a data file to all participants in the share group. If this is selected, then once a user selects a data file, then any linear motion (other than a minimal touch by the user) will cause the data file to be transmitted to all participants. This enables all participants to receive the data file quickly and easily.

Instead of delineating a line on the touchscreen 56, the user 40 may flick his/her wrist towards the intended recipient. In such a case, the application 70 would detect a change in state of the accelerometer 60 and then transmit this information as part of the data package.

Scenario 2—Interactive Game

The second scenario occurs in the games room 14. In this scenario there are two registered users 40e and 40f who are playing a game. The players register with the management application 32 in a similar way to the first scenario. One of the registered users then creates a share group that is public, but local to the games room 14 (in other words, a user 40 needs to be in the physical vicinity of the games room 14 to participate).

In this scenario, the management application 32 executes a two-person game of virtual catch.

Figure 6:
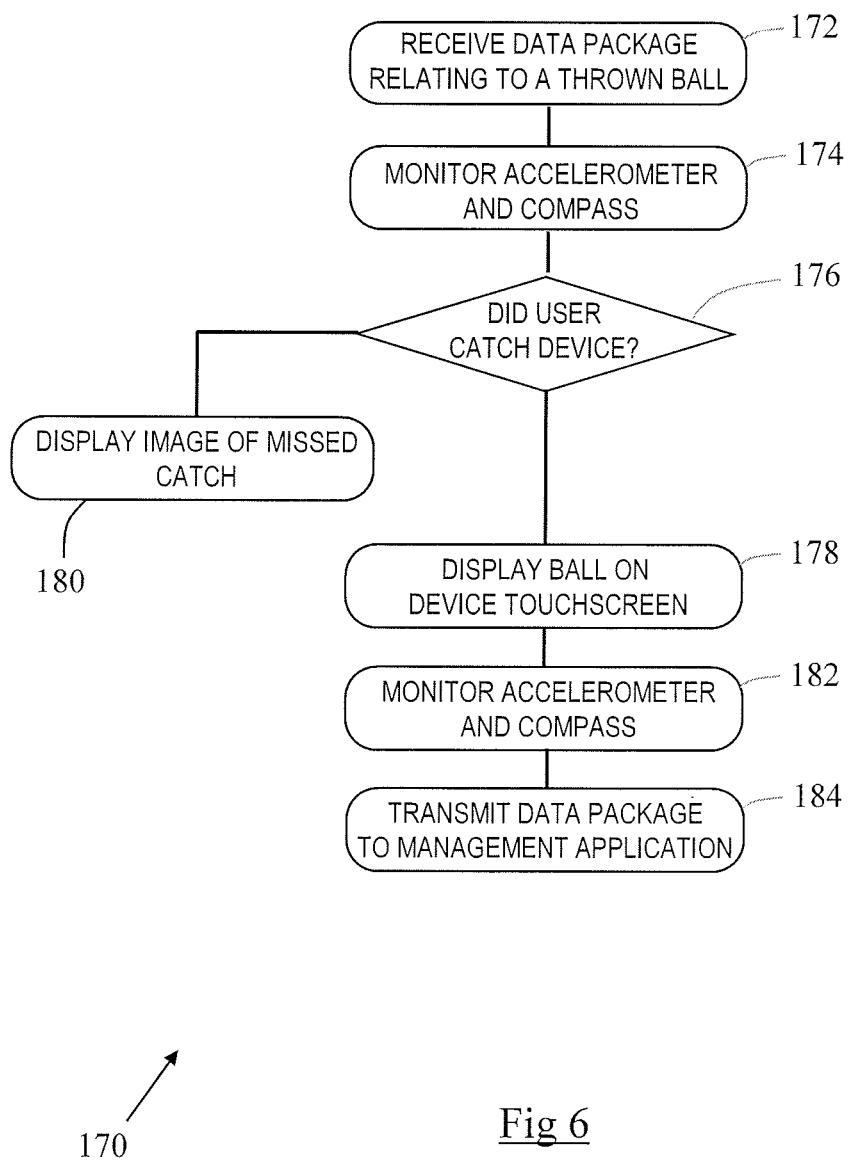
FIG. 6 is a flowchart illustrating the steps implemented by the application executing on the mobile device of FIG. 2 as part of a game involving data transfer.

Reference will now be made to FIG. 6, which is a flowchart 170 illustrating the steps implemented by the application 70 as part of the game of virtual catch.

Initially, the management application 32 sends a data package to one of the registered devices (for example, 50e). This registered device 50e receives the data package (step 172), which includes details of the object (ball) being thrown (including its size and shape), the trajectory of the ball, and the speed of the ball.

The user 40e then tries to catch the ball by moving her device 50e to the spatial location to which the ball appears to be heading. The application 70 monitors the accelerometer 60 and the digital compass 62 (step 174) to ascertain if the user 50e has "caught" the ball (that is, if the user 40e has moved the device 50e to where the ball would be based on the ball's trajectory and speed) (step 176). If the user 40e successfully "catches" the ball, then the application 70 displays the ball on the touchscreen 56 (step 178); otherwise the application 70 displays an image indicating that the ball was missed (step 180).

The user 40e can then "throw" the ball to the other participant (user 40f). The application 70 monitors the accelerometer 60 and the digital compass 62 for changes that would indicate that the user 40e has attempted to throw the ball (step 182).

When a change is detected, the application 70 sends a data package to the management application 32 including data from the accelerometer 60 and the digital compass 62 (step 184). The management application 32 passes this data to the device 50f to enable the application 70 to ascertain if the user 40f catches or misses the virtually thrown ball.

The process continues as the users 40e and 40f continue to throw the virtual ball back and forth to each other.

Scenario 3—Printing a Document

The third scenario relates to the print station zone 20. In this scenario the print station itself is a registered device that has registered to provide printing facilities (both color and black and white) for registered users in a private printing share group. The private printing share group is limited to employees and invited guests of the office area 10. However, in other embodiments, a printing station may be provided that charges for printing and that is publicly available.

In this scenario, a registered user (for example, user 40k) is at the vending area 22 and remembers that he would like to print a document. The user 40k selects the document on his mobile device 50k, selects a print option presented on a menu of the application 70, and then makes a flicking motion with his finger across the touchscreen 56. This is detected by the application 70, which sends a data package to the management application 32. In addition to information from the digital compass 62 and the GPS device 64, the application 70 also sends information indicating that the user 40k has requested printing of the document.

In this example, there is only one printing station, so this is selected by the management application 32. In other examples there may be multiple printing stations, in which case the management application 32 will select the one closest to the direction pointed to by the action of the user 40k (provided it is located sufficiently close to the user's device 50k).

Once the management application 32 has transmitted the document to the printing station for printing, and once the printing station has confirmed successful printing, then the management application 32 notifies the application 70 that printing has been successful, and also identifies the printer that was used (either by name or by geographical position). The user's mobile device 50k may direct the user 40k to the printer that was used.

Although only three scenarios have been described it will be apparent to the skilled person that many other scenarios are possible. For example, games may involve card dealing, driving virtual cars, gambling, multiple players spread across a large geography, and the like. Other scenarios may involve transfer of virtual cash, and handing out flyers and/or coupons to people in a certain location.

Various modifications may be made to the above described embodiment within the scope of the invention, for example, in the above embodiment, the user is described as registering with the management application 32, in other embodiments, the user's device may register with the management application 32. This would allow the user to have multiple devices registered simultaneously, so that the user could easily move data between devices (for example, from a mobile phone to a tablet computer).

The layout of the office 10 and the different zones shown are merely illustrative, and are provided only to give a specific example of the types of environment in which embodiments of the invention may be implemented. Many other types of environment, such as casinos, stadia, and the like, could be given.

One variation of the ball throwing game (virtual catch) described in scenario two above is for the management application 32 to ascertain if the receiving mobile device has successfully caught the ball. This may involve the following steps. The owner of device A holds the virtual ball. The owner of device B stands close by and is ready to receive the ball. The owner of device A moves device A as if he/she was throwing a ball. The application on device A calculates the position of device A at the start and end of the motion and also uses the information from sensors within device A to allow it to calculate the velocity of the virtual ball. This information is then packaged into a message and sent to the management application 32. The management application 32, which is already monitoring the position and movement of both devices (device A and B), receives the message and uses the information in the message to identify if device B will intercept the "ball" or if it is out of range. If it is in the correct position the data will be sent to device B. Device B processes the received data indicating to the user of device B that the virtual ball has been successfully caught. If device B is not in the correct position to receive the virtual ball from device A, then the management application 32 sends a failed catch message to device B and also to device A. Device B would indicate to its user that he/she did not catch the virtual ball. Device A would indicate to its user that the other player failed to catch the virtual ball.

The management application 32 may also send status information to device B (and device A) throughout the game to highlight the progress of the data. The users of devices A and B may monitor this data to enable them to move into the "path" of the data to catch the ball.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of implementing data transfer from a mobile device, the method comprising:
  (i) receiving, by a server, positional information sent from the mobile device and receiving, by the server, an orientation of the mobile device and the orientation sent from the mobile device, wherein receiving further includes registering the mobile device when the mobile device enters an office that defines an interaction environment, receiving a share group creation request from the mobile device and prompting the mobile device for parameters;
  (ii) receiving, by the server, directional information sent from the mobile device, wherein the directional information is ascertained by the mobile device using an internal accelerometer, thereby detecting how a user of the mobile device is moving the mobile device and the directional information received as at least a portion of the parameters for the share group creation request, transmitting the portion of the parameters to a management application, receiving a group request confirmation from the management application, and notifying the user operating the mobile device of the group request confirmation;
  (iii) receiving, by the server, data sent from the mobile device;
  (iv) ascertaining, by the server, the receiving device based on the received directional information and the orientation of the mobile device, and ascertaining a plurality of receiving devices selected by the user of the mobile device in addition to the received directional information from the mobile device, and ascertaining the receiving device based also on received velocity and/or acceleration information from the mobile device; and
  (v) providing, by the server, the data received from the mobile device to the ascertained receiving device.

2. A method according to claim 1, wherein steps (i) to (iii) are implemented concurrently or in any desired order.

3. A method according to claim 1, wherein ascertaining a receiving device based on the received directional information includes ascertaining a device located in the direction of motion provided by the user of the mobile device.

4. A method according to claim 1, wherein providing the data received from the mobile device to the ascertained receiving device includes providing the ascertained receiving device with an identification of the mobile device.

5. A management application executing on the server and operable to implement the steps of claim 1.

* * * * *